3,328,265
PROCESS FOR THE QUANTITATIVE SEPARATION OF FORMALDEHYDE FROM AQUEOUS SOLUTIONS BY PRESSURE DISTILLATION
Wilhelm Riemenschneider and Otto Probst, Frankfurt am Main, Germany, assignors to Farbwerke Hoechst Aktiengesellschaft vormals Meister Lucius & Bruning, Frankfurt am Main, Germany, a corporation of Germany
Filed Dec. 11, 1964, Ser. No. 417,815
Claims priority, application Germany, Dec. 14, 1963, F 41,549
2 Claims. (Cl. 203—17)

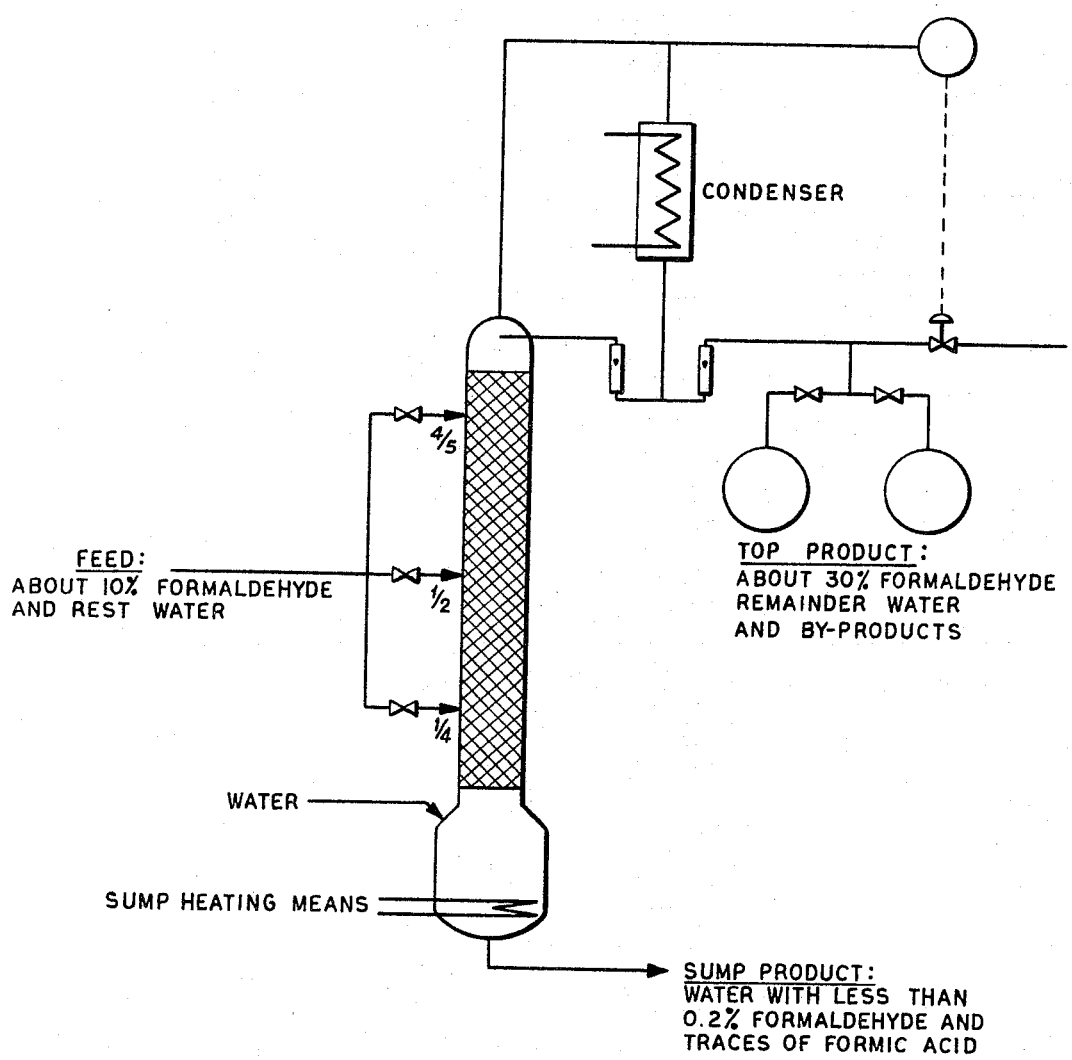

It is known that dilute aqueous formaldehyde solutions can be worked either by enriching the formaldehyde in the distilling sump by vacuum distillation or by distilling the main quantity of the formaldehyde at the head of a column by pressure distillation.

When working according to the processes known hitherto, however, it has not been possible to separate formaldehyde and water quantitatively so that after the formaldehyde has been obtained there always remain behind minor or larger portions of aldehyde in the water-enriched part of the distilling zone, which does not only result in considerable losses of yield but entails additional purification operations before the solution can be discharged as industrial sewage. As is well-known, the discharge of sewage containing formaldehyde into watercourses is prohibited.

Now we have found a process for obtaining a sewage that is practically free from formaldehyde by concentrating aqueous formaldehyde solutions by pressure distillation in a distilling zone by distilling the concentrated formaldehyde solution at the head of the distilling zone, which comprises introducing boiling water into the sump of the distilling zone, continuously feeding in the aqueous formaldehyde solution to be concentrated at a height of one quarter to four quarters of the total height of the distilling zone and discharging a product that is practically free from formaldehyde from the sump of the distilling zone. The procedure consists of a steam pressure distillation, in which case the discharged sump product can be drained off without additional intermediate treatment as sewage which is unobjectionable from a biological point of view.

The process enables the quantitative separation of the components in such a manner that practically the total quantity of the formaldehyde is distilled at the head of the column and, after passing through a cooling zone, collected as a more or less highly concentrated formaldehyde solution which can be used for other purposes. The water of the originally employed formaldehyde solution, hereinafter called "basic solution" trickles—apart from the portion that passes into the concentrated solution at the head of the column—into the sump of the column without contaminating the latter with formaldehyde. The sump liquid which, during long periods of reaction, is most advantageously discharged in a continuous manner, has such a high degree of purity that it is not necessary to subject the sewage to one of the conventional after-treatments, for example to a biological after-treatment, before it is drained off into the sewerage.

In this manner it has become possible to work up dilute aqueous formaldehyde solutions in such a manner that, on the one hand, the formaldehyde is recovered almost quantitatively in a concentrated form and, on the other hand, a sewage is obtained that can be drained off without disturbing the fauna and flora of the rivers.

The figure herein shows a schematic illustration of the process.

The process is carried out in a column of conventional construction, for example in a packed column or a bubble tray column which, for the quantitative separation of the solution introduced into formaldehyde and water, should advantageously have at least 10 trays. The maximum number of trays is not limited by physical-chemical considerations but only by economic considerations. The optimum number of bubble trays ranges from about 40 to 60.

The sump of the column, which may be designed in the form of a still or a circulation evaporator, is first filled with water and slowly caused to distill under a given pressure. It has proved advantageous to maintain pressure zones within the range of from 1 to 20 atmospheres gage, which corresponds to a sump temperature of 120° to 200° C. The most favorable working range, i.e. the greatest separation effect, lies at pressures ranging from 2 to 6 atmospheres gage, preferably about 4 atmospheres gage. When the operation is carried out at a substantially higher pressure, the formaldehyde is liable to undergo the Cannizzaro reaction owing to the correspondingly higher temperature of the formaldehyde which entails higher or lower losses of yield. Within the optimum pressure range of from 2 to 6 atmospheres gage the losses of yield caused by the Cannizzaro reaction are so small that they can be neglected; they lie within the range of about 0.3 to 0.8% by weight, calculated on the formaldehyde applied. It has not proved useful to operate under pressures of less than 1 atmosphere gage, since in this case the distillation works irregular so that it is easily possible that a small amount of formaldehyde might be entrained into the sump.

The formaldehyde solution to be worked up is fed by means of a pump into the column, which is already operating with water, at a height situated between one-fourth and four-fifths of the total height of the column. It has proved to be most advantageous when the basic solution is introduced into the column at about three-quarters height of the total height of the column. The concentration of the head product can be increased by raising the reflux ratio. The amount to be introduced by pumping shall, however, be limited such that the formaldehyde, under the given working conditions, does not penetrate into the sump, which can easily be determined by a formaldehyde titration of a test portion of the pump. The formaldehyde concentration of the basic solution can vary within wide limits; it is generally within the range of from 3 to 30% of formaldehyde.

The concentration of the formaldehyde solution distilled at the head of the column can be altered substantially by altering the reflux ratio. The greater the reflux ratio, the higher the concentration of the distilled formaldehyde solution. When using the same solution of, for example, about 8% strength, there is obtained, for example, at a reflux ratio of 1:2 a distillate containing 20% of formaldehyde, and at a reflux ratio of 1:10 a distillate containing 45% of formaldehyde.

The water discharged from the sump of the column contains a maximum of 0.2% of formaldehyde. However, when employing the optimum working method the content of formaldehyde in the sump is smaller than 0.002% (=20 p.p.m.). Depending on the force of the Cannizzaro reaction that has taken place, about 0.002–0.1% of formic acid is still contained in the sump of the column, or corresponding amounts of methanol in the head solution. Prior to being drained off into the sewerage, the formic acid may be slightly neutralized.

When the basic solution contains, in addition to formaldehyde and water, still other constituents, said solution can likewise be distilled under the conditions indicated above, in which case regard must be had to the fact, however, that the other components, depending on their boiling points, are encountered again in the head or sump product of the column. As further constituents there may be used especially Cannizzaro products such as, for example, methanol, formic acid and methyl formiate, however, also extraction agents such as, for example, methylene chloride, benzene and cyclohexane. It is fundamentally possible also to separate other soluble constituents by the process according to the invention; however, it must be taken into account that these constituents, depending on their boiling points, are encountered again in the sump so that a biologically unobjectionable sewage may not be obtained.

The process cannot only be employed for the continuous preparation of more or less highly concentrated formaldehyde solutions, in which case the conventional expensive purification of sewage effluents can be dispensed with, but also for the removal of formaldehyde from dilute solutions obtained as waste water from other processes. There are in any case obtained biologically unobjectionable sump products containing preferably less than 20 p.p.m. of formaldehyde.

The following examples serve to illustrate the invention, but they are not intended to limit it thereto:

Example 1

A pressure distilling apparatus consisting of a still of 300 l. volume, a column having a diameter of 150 mm. and a height of 10 m. which was packed with 15 mm. Rashig rings, a condenser operated with water having a temperature of 40–45° C., a reflux divider adjustable by rotameter and a corresponding pressure recipient was operated under the following conditions: In the sump, 200 l. of water were brought to the boil under a pressure of 4 atmospheres gage by means of steam pressure, and distillation commenced. The sump temperature was 152° C. Then 40 kg. of an aqueous 9% formaldehyde solution was introduced per hour by pumping into the column at three quarters height of the total height of the column. The reflux ratio at the head of the column was adjusted at 1:5. There were obtained per hour 12 kg. of a head distillate containing 30% of formaldehyde and 28 kg. of a sump product containing 30 p.p.m. of formaldehyde and 0.04% of formic acid. The loss owing to the Cannizzaro reaction amounted to 0.3% calculated on the formaldehyde applied.

Example 2

In the apparatus as described in Example 1, the operation was carried out under the same conditions with the difference that, per hour, 40 kg. of an aqueous solution containing 9% of formaldehyde and 2% of methanol were introduced by pumping. At a reflux ratio of 1:7 there was obtained, per hour, as head distillate 8.5 kg. of an aqueous solution containing 42% of formaldehyde and 9.6% of methanol, and as sump product 31.5 kg. of an aqueous solution containing 20 p.p.m. of formaldehyde and 0.05% of formic acid. The loss of formaldehyde amounted to about 0.6%.

Example 3

A pressure distilling apparatus, consisting essentially of a circulation evaporator and a bubble tray column having a diameter of 150 mm., a length of 10 m. and 50 bubble trays, was operated with water under a pressure of 4 atmospheres gage and charged, per hour, with 70 kg. of an aqueous solution containing 8.5% of formaldehyde, 1.1% of methanol and 0.08% of formic acid. The solution was fed in between the 36th and 37th tray. The distillation was carried out at a reflux ratio of 1:1.5; at the head of the column 33 kg. of an aqueous solution was obtained which contained 17.8% formaldehyde and 2.4% methanol. From the sump of the column there was discharged per hour 37 kg. of an aqueous solution containing 0.1% of formaldehyde and 0.1% of formic acid.

We claim:

1. In a pressure distillation process for recovering from a distilling zone from a dilute aqueous formaldehyde solution substantially formaldehyde free water as a sump product and a more concentrated formaldehyde solution as a head product, the improvement consisting essentially of: boiling in the sump of the distilling zone water at a temperature of 120° C. to 200° C. said zone being maintained at 1 to 20 atmospheres gauge; feeding into the distilling zone in a continuous manner at one-quarter to four-fifths of the total height of the distilling zone an aqueous formaldehyde solution having a formaldehyde concentration of from 3 to 30% by weight; operating the distilling zone at a reflux ratio in excess of 1:1.5; recovering as a sump product substantially formaldehyde-free water, the formaldehyde content therein being less than 0.2%; and recovering as a head product the more concentrated formaldehyde solution.

2. The process according to claim 1 wherein the pressure is within the range of from 2 to 6 atmospheres gauge, the water contains at most 0.2% by weight of formaldehyde, the reflux ratio is from 1:1.5 to 1:10, and the introduced formaldehyde solution contains as an impurity methanol, formic acid, methyl formate, methylene chloride, benzene or cyclohexane.

References Cited

UNITED STATES PATENTS

| | | | |
|---|---|---|---|
| 2,452,412 | 10/1948 | Wong | 203—17 |
| 2,527,655 | 10/1950 | Pyle et al. | 203—17 |
| 2,565,568 | 8/1951 | McCants | 203—17 |
| 2,675,346 | 4/1954 | MacLean | 260—606 |
| 3,174,913 | 3/1965 | Gesting et al. | 203—54 |

FOREIGN PATENTS

| | | |
|---|---|---|
| 479,255 | 2/1938 | Great Britain. |

NORMAN YUDKOFF, *Primary Examiner.*

W. L. BASCOMB, *Assistant Examiner.*